United States Patent [19]

Wilson et al.

[11] Patent Number: 4,893,308

[45] Date of Patent: Jan. 9, 1990

[54] METHOD AND APPARATUS FOR TIME COMPANDING A DIGITAL VOICE SIGNAL

[75] Inventors: Alan L. Wilson, Hoffman Estates; Michael W. Bright, Arlington Heights; Michelle M. Bray; Eric F. Ziolko, both of Schaumburg; David L. Weiss, Roselle, all of Ill.

[73] Assignee: Motorola, Inc., Schaumburg, Ill.

[21] Appl. No.: 903,315

[22] Filed: Sep. 3, 1986

[51] Int. Cl.$^4$ .............................................. H04J 3/06
[52] U.S. Cl. .................................. 370/109; 370/111; 381/34
[58] Field of Search ..................... 370/111, 109, 110.1; 381/34, 35; 375/122

[56] References Cited

U.S. PATENT DOCUMENTS

| | | | |
|---|---|---|---|
| 4,158,748 | 6/1979 | En ........................................ | 178/69.1 |
| 4,266,243 | 5/1981 | Shutterly ............................. | 358/121 |
| 4,271,520 | 6/1981 | Coombes et al. ..................... | 371/42 |
| 4,354,265 | 10/1982 | Nyberg et al. ...................... | 370/111 |
| 4,394,760 | 7/1983 | Kammerlander .................... | 370/111 |
| 4,434,323 | 2/1984 | Levine et al. ....................... | 178/22.17 |
| 4,516,241 | 5/1985 | Farah et al. ......................... | 370/111 |
| 4,567,591 | 1/1986 | Gray et al. .......................... | 370/109 |
| 4,608,456 | 8/1986 | Paik et al. ........................... | 380/28 |
| 4,631,746 | 12/1986 | Bergeron et al. .................... | 381/35 |
| 4,654,480 | 3/1987 | Weiss ................................... | 380/48 |
| 4,667,327 | 5/1987 | Bright et al. ........................ | 371/47 |
| 4,680,797 | 7/1987 | Benke .................................. | 381/41 |
| 4,697,264 | 9/1987 | Galenskey et al. ................. | 370/111 |

*Primary Examiner*—Douglas W. Olms
*Assistant Examiner*—Min Jung
*Attorney, Agent, or Firm*—Thomas G. Berry; Steven G. Parmelee

[57] ABSTRACT

Disclosed is a method and apparatus for time companding a digital voice signal wherein, single bits are periodically removed from the digital voice signal, which is then compressed thereby forming a contiguous area of removed bits. A synchronization signal is inserted into this area and the combined signal is transmitted. At the receiver, the synchronization signal is extracted and is used to synchronize the receiver. The digital voice signal is then expanded and the removed bits are predicted and replaced.

22 Claims, 4 Drawing Sheets

| Clock Cycles | \multicolumn{9}{c|}{RAM ADDRESSES} | Output |

| Clock Cycles | 0 | 1 | 2 | 3 | 4 | 5 | 6 | 7 | 8 | Output |
|---|---|---|---|---|---|---|---|---|---|---|
| 0 | WR | | | | | | | | | SIGNAL |
| 1 | | WR | | | | | | | | SIGNAL |
| 2 | | | WR | | | | | | | SIGNAL |
| 3 | | | | WR | | | | | | SIGNAL |
| 4 | | | | | WR | | | | | SIGNAL |
| 5 | | | | | | WR | | | | SIGNAL |
| 6 | | | | | | W | R | | | SIGNAL |
| 7 | | | | | | | W | R | | SIGNAL |
| 8 | | | | | | | | W | R | SIGNAL |
| 9 | R | | | | | | | | W | 0 |
| 10 | W | R | | | | | | | | 1 |
| 11 | | W | R | | | | | | | 2 |
| 12 | | | W | R | | | | | | 3 |
| 13 | | | | W | R | | | | | 4 |
| 14 | | | | | W | R | | | | 6 |
| 15 | | | | | | W | R | | | 7 |
| 16 | | | | | | | W | R | | 8 |
| 17 | | | | | | | | W | R | 9 |
| 18 | R | | | | | | | | W | 10 |
| 19 | | R | | | | | | | W | 12 |
| 20 | | | R | | | | | | W | 13 |
| 21 | W | | | R | | | | | | 14 |
| 22 | | W | | | R | | | | | 15 |
| 23 | | | W | | | R | | | | 16 |
| 24 | | | W | | | | R | | | 18 |
| 25 | | | | W | | | R | | | 19 |
| 26 | | | | | W | | | R | | 20 |
| 27 | R | | | | | W | | | | 21 |
| 28 | | R | | | | | W | | | 22 |
| 29 | | | R | | | | W | | | 24 |
| 30 | | | | R | | | | W | | 25 |
| 31 | | | | | R | | | W | | 26 |
| 32 | W | | | | R | | | | | 27 |
| 33 | | W | | | | R | | | | 28 |
| 34 | | | W | | | R | | | | 30 |
| 35 | | | | W | | | | R | | 31 |
| 36 | R | | | W | | | | | R | 32 |
| 37 | | R | | | W | | | | | 33 |
| 38 | | | R | | W | | | | | 34 |
| 39 | | | | R | | W | | | | 36 |
| 40 | | | | | R | | W | | | 37 |
| 41 | | | | | | R | | W | | 38 |
| 42 | | | | | | R | | W | | 39 |
| 43 | W | | | | | | R | | | 40 |
| 44 | | W | | | | | | R | | 42 |
| 45 | R | | W | | | | | | | 43 |
| 46 | | R | | W | | | | | | 44 |
| 47 | | | R | | W | | | | | 45 |
| 48 | | | | R | W | | | | | 46 |
| 49 | | | | R | | W | | | | 48 |
| 50 | | | | | | R | W | | | 49 |
| 51 | | | | | | R | | W | | 50 |
| 52 | | | | | | | R | W | | 51 |
| 53 | W | | | | | | | R | | 52 |
| 54 | WR | | | | | | | | | SIGNAL |
| 55 | | WR | | | | | | | | SIGNAL |

METHOD AND APPARATUS FOR TIME COMPANDING A DIGITAL VOICE SIGNAL

TECHNICAL FIELD

This invention relates generally to data communications and more particularly to data communication systems that interleave synchronization information (or the like) with a data signal and is more particularly directed to a method and means for interleaving synchronization and other information with a digital voice signal.

BACKGROUND OF THE INVENTION

Those skilled in the art will appreciate that when a digital signal is received for processing it is necessary to establish synchronization between the receiver and the incoming data stream. Historically, digital communication systems that transmitted stored data, such as computer data, experienced little difficulty in adding a synchronization signal since the data could be stopped and re-started at any time, without loss of continuity as viewed from the receiving computer terminal. However, this technique does not readily apply to interleaving a synchronization signal into a continuous voice message since it may lead to an intolerably interrupted received message.

Accordingly, the self-synchronous digital communication system, wherein the data is of a non-framed, serial nature, became widely used. In this system, a clock which can be recovered from the incoming data bits, is all that is required to synchronize the system. There are cases, however, where additional synchronization information is needed. For example, if the serial data is encrypted, the state of the transmitter encryption device must be sent to the receiver decryption device so that the data can be decrypted. It is possible to have the encryption process also be self-synchronous, requiring only the encrypted data stream to synchronize the receiver, but this introduces a detriment to the system in the form of range reduction. This is brought on with self-synchronous encryption by an error made at the receiver being multiplied by the decryption process to add a burst of errors to the decrypted data By sending the state of the transmitter encryption device as synchronization information periodically within the encrypted digital signal, it is possible for the receiver to extract the synchronization information without the penalty of error multiplication. This allows encryption to be used without the penalty of range reduction present with the self-synchronous encryption systems. However, no convenient method exists for interleaving synchronization information into a digital voice signal. Therefore, a need exists for a convenient method to allow additional synchronizing information to be added to continuous digital voice information.

SUMMARY OF THE INVENTION

Therefore, it is an object of the present invention to provide an improved synchronous digital voice communication system.

It is another object of the present invention to provide a method and apparatus for compressing a continuous digital voice signal to allow the interleaving of at least a synchronization signal.

It is a further object of the present invention to provide a method and means for expanding a compressed digital voice signal to recover the transmitted information.

Accordingly, these and other objects are achieved in the present time compander for a digital voice signal.

In practicing the invention, single bits or small groups of bits are periodically removed from the digital voice signal, which is then compressed thereby forming a contiguous area of removed bits. A synchronization signal is inserted into this area and the combined signal is transmitted. At the receiver, the synchronization signal is extracted and is used to synchronize the receiver. The digital voice signal is then expanded and the removed bits are predicted and replaced. In this way, the receiver may synchronize to the interleaved synchronization signal and the digital voice signal appears continuous to the receiver.

BRIEF DESCRIPTION OF THE DRAWINGS

The features of the present invention which are believed to be novel are set forth with particularity in the appended claims The invention, together with further objects and advantages thereof, may be understood by reference to the following description, taken in conjunction with the accompanying drawings, and the several figures of which like referenced numerals identify like elements, and in which:

FIG. 3 is an operational illustration of the compressor of FIG. 1 (for N equal to 6 and S equal to 9);

FIG. 4 is an operational illustration of the expander of FIG. 2 (for N equal to 6 and S equal 9).

DETAILED DESCRIPTION OF THE PREFERRED EMBODIMENT

Figure 1:
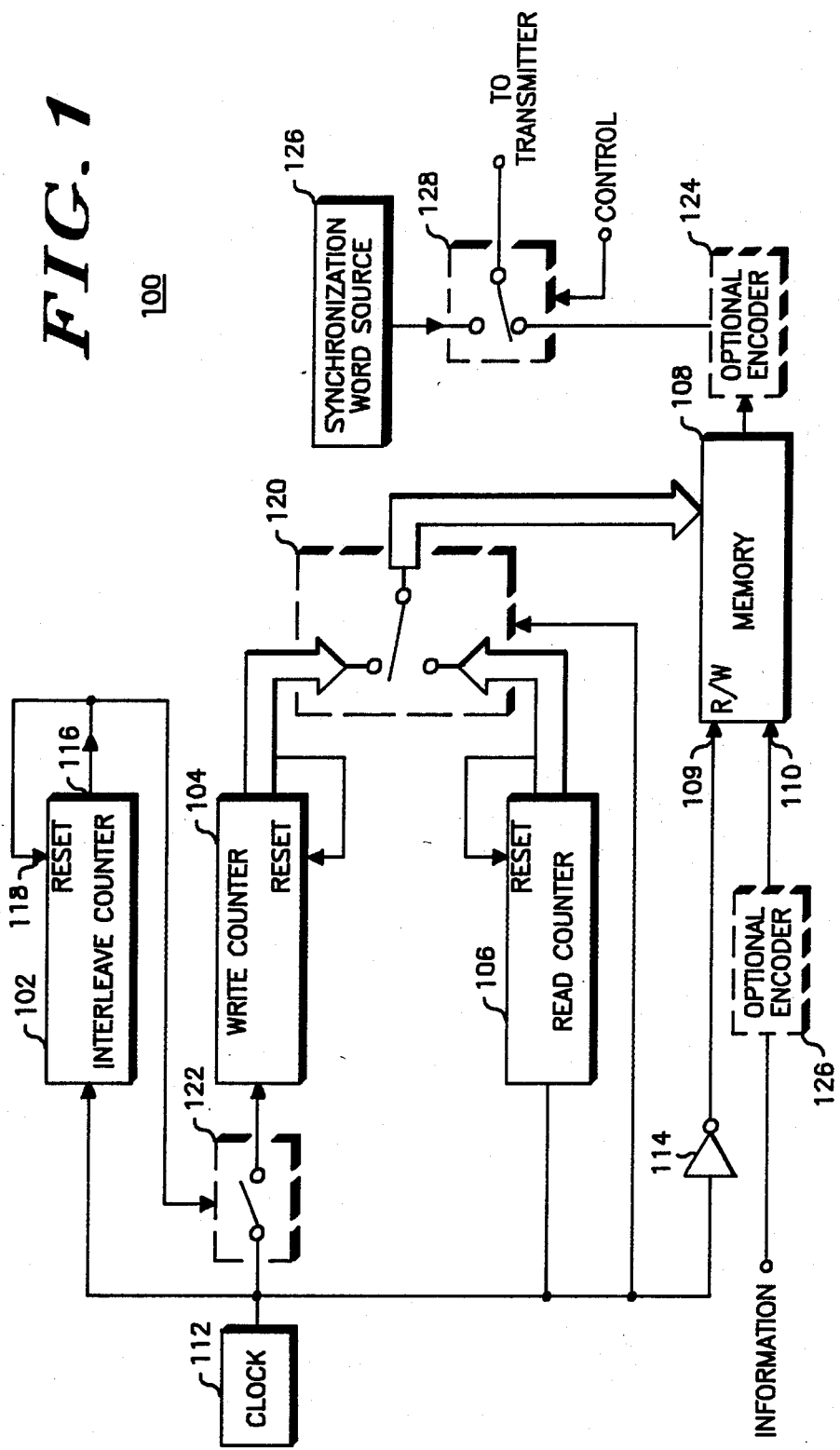
FIG. 1 is an exemplary block diagram of the compressor of the present invention.

In FIG. 1 there is shown the digital voice time compressor 100 of the present invention. Those skilled in the art can appreciate that human speech contains a large amount of redundant information. Speech production may be modelled as an excitation signal (i.e., air from the lungs) driving a filter (the vocal tract), which possesses a certain resonant structure The spoken sound changes with time since the filter varies with time. The excitation is noise-like for unvoiced sounds (i.e., consonants) and appears as a periodic excitation for voiced sounds (for example vowels). The continuous noise-like consonants, combined with the periodic excitation of vowels, produces a voice signal having a highly redundant information content. When the speech signal is digitized, the redundancy is preserved in the digital representation of the speech signal. Since the information content is redundant, some of the bits of the digital voice signal may be removed to make room for a data signal, such as a synchronization signal. At the receiver, the redundancy of the voice signal may be exploited and the removed bits may be predicted from the portion of the transmitted voice signal. It is especially convenient if the technique used to digitize an inherently redundant voice signal produces redundant digital patterns Such techniques are known in the art, such as, for example, Continuously Variable Slope Delta-Modulation (CVSD) is known to produce a digital waveform having several consecutive "ones" and "zeros". Judicious selection of the digitizing technology may ease the actual implementation by allowing a less complicated predictor at the receiver.

Additionally, the present invention operates equally well on data, such as computer data, provided that it contains, or may be adapted to contain, redundant information that enables prediction of he periodically removed bits. Of course, it is possible to simply remove a block of bits and insert a synchronization signal prior to transmission. However, such practice typically will not satisfactorily operate because any single bit or small group of bits can be predicted from its neighbors, but a large block of bits would be difficult to predict since its neighbors have been removed. Thus, the preferred method is to periodically remove single or small groups of bits and compress the remaining digital signal.

Referring still to FIG. 1, the compressor 100 is comprised chiefly of an interleave counter 102, a write counter 104, a read counter 106 and a random access memory (RAM) 108. The length of the interleave counter 102 is defined as being the interleave count (N). The write counter 104, the read counter 106 and the RAM 108 are all of a common length referred to as the address count (S), and is equal to the number of data or synchronization bits that are to be inserted in the digital information stream. In the preferred embodiment of the present invention, the interleave count (N) equals 24 and the address count (S) equals 256, although the present invention is not constrained to these values and any other values may be selected without departing from the teachings of the present invention.

The interleave counter 102, the write counter 104, and the read counter 106 may be any suitable counter and may be implemented in integrated circuit (IC) form or their function may be incorporated via an internal register of a microprocessor or the like. Similarly, the RAM 108 can be any suitable memory means having a size (S) that is equal to the amount of data to be inserted and transmitted. As is known, certain microprocessors have an internal RAM area, and provided the RAM is of sufficient size, all major components of the compressor 100 may reside within a single microprocessor chip.

Operationally, prior to transmission, all counters are preferably reset so that the memory addresses start at zero. The information signal to be transmitted (be it data or digitized voice) is presented to the input port 110 of the RAM 108, and is synchronized to a clock 112. Optionally, the information signal may be encoded, such as by an encryption device, in the optional encoder 126 prior to being clocked in the RAM 108. The interleave counter 102 and the write counter 104 begin "up-counting" in synchronization to the clock signal 112. That is, for each clock pulse, the count of the pulses is incremented by a predetermined value (one in the preferred embodiment). The read counter 106 also increments from the clock signal 112. Both the read counter 106 and the write counter 104 reset when they reach the maximum count of S.

The write counter 104 and the read counter 106 provide the addresses for the RAM 108. As each bit of information is clocked into the RAM 108, an address is received from the write counter 104 via the switch 120. The switch 120 is controlled by the clock 12, which is also coupled to the RAM's read-write (R/W) control port 109 through inverter 114. If the memory's R/W signal were inverted, inverter 114 would not be required. Thus, when the clock signal changes state, the RAM 108 is then in the read mode and a read address is provided from the read counter via the switch 120.

As previously mentioned, the interleave counter 102 has length N. Accordingly every N clock cycles a pulse will be presented at the interleave counter output 116. This pulse is routed to a reset port 118 of the interleave counter 102, which resets the interleave counter to a logical zero state to resume up-counting again. The output port 116 of the interleave counter 102 also controls the switch 122.

When the interleave counter 102 asserts its output pulse, the Nth clock pulse is prevented from reaching the write counter 104 due to the opened switch 122. This keeps the write address the same for two consecutive clocks causing the previous bit to be over written before it is read. The effect is that every Nth bit of the information signal presented at the RAM input port 110 is discarded.

For N consecutive clock cycles the read and write addresses are the same. In the compressor it does not matter whether the RAM is written to or read from first, however, in the preferred embodiment of the present invention, the RAM is first written to. This is done by having counters 102, 104, and 106 increment on the rising edge of clock and having switch 120 select the write counter with the memory in the write mode when clock is a logical one. Other combinations are possible.

The first S bits to be read out of the RAM 108 are replaced by synchronization information. The synchronization information may be inserted via the synchronization source 126 and the switch 128 and transmitted over whatever communication channel may be employed. Following this, the information signal travels through the RAM 108 on a first-in-first-out (FIFO) basis until all the digital information is sent. In this way the synchronization data may be transmitted after (N-1) x S bits (5,888 bits in the preferred embodiment).

Instead of sending the information directly through the system it may be encoded, such as by an encryption device, error corrector, or the like in the optional encoder 124 or 126. Typically, only one of the optional encoders 124 and 126 would be used in any particular implementation. The alternate placement of FIG. 1 merely illustrates the flexibility of the present invention to accept additional elements without departing from the teachings of the present invention.

Figure 2:
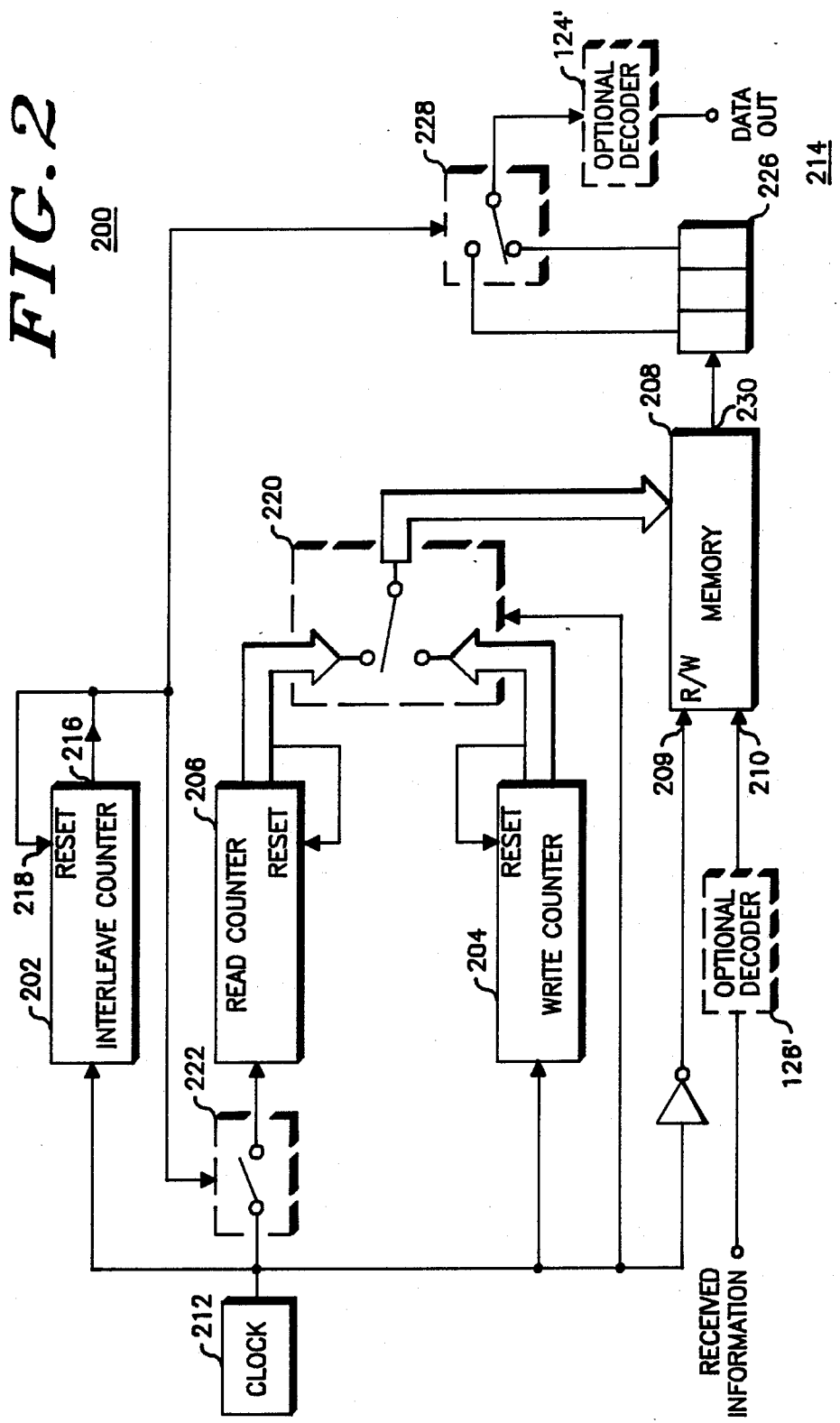
FIG. 2 is an exemplary block diagram of the expander of the present invention.

Referring now to FIG. 2 the expander 200 is shown in exemplary block diagram form. As is readily apparent, the expander 200 is substantially similar to the compressor 100, which simplifies designs and may allow the compressor and expander to share common circuitry. Of course, for full duplex, a transceiver would require one each of the compressor 100 and the expander 200.

To describe the operation of the expander 200, it is assumed that the first S bits of the transmitted digital signal (sync data) have been received and removed from the information bits by any suitable synchronization means, thereby providing information bits synchronized to the clock 212. The information is written into and read from the RAM 208 on a first-in-first-out basis using the addresses provided by the write counter 204. The information is read out of the RAM 208 using the addresses provided by the read counter (206)-N-1 bits at a time where the Nth bit is added by the predictor 214.

As for the compressor, for N consecutive clock cycles the read and write addresses are the same. In the expander it is important that the RAM is first written to before being read. Accordingly, the present invention increments the counters 202, 204, and 206 on the rising edge of clock, and switch 220 selects the write counter with the memory in the write mode when clock is a logical one. Of course, other combinations are possible to achieve the same result.

If the information was optionally encoded at the transmitter using encoder 124, the information may be first decoded in the decoder 126 prior to being clocked into the RAM 208.

The predictor 214 is comprised of a shift register 226 and a switch 228 and is best described as a digital predictor which reinserts the removed Nth bit from the transmitter. Those skilled in the art will appreciate that inserting a random bit would result in a 50% probability of error. Therefore it is desirable to employ a predictor to improve the probability of making a correct decision. This is particularly advantageous for digitized voice information which has been encoded using a Continuously Variable Slope Delta-Modulator (CVSD). CVSD coded voice has a desirable property of having a likelihood of consecutive logical ones and logical zeroes. Therefore, a very simple predictor can be implemented wherein every Nth bit, the second predecessor (in time) is inserted. Of course, other predictors may be used (for example using the 3rd or 4th preceding bits, or a combination of bits with a R OM look-up table), without departing from the teachings of the present invention.

In operation, the predictor 214 accepts the, information from the RAM 208 via an output port 230. Ordinarily, the bit just received at the shift register 226 is routed (via the switch 228) to whatever subsequent circuitry as may be employed In particular, the output of the predictor 214 may be optionally sent to the decoder 124' if the information was encoded at the transmitter using the optional encoder 126. However, when the interleave counter 202 asserts an output pulse (every Nth clock) the switch 228 forwards the second predecessor in time (i.e., the bit that was outputted two bits previous). This simple predictor increases the probability of a correct decision to approximately 75%, which provides a suitable intelligibility rate for digitized voice (N=24 in the preferred embodiment).

Referring now to FIG. 3, an illustration of the compressor of FIG. 1 is shown for the simple case of S equal 9 and N equal 6. The RAM 108 addresses are arranged from left to right across the top. The clock cycles from the clock 112 are listed sequentially along the left margin. The output of the RAM 108 is illustrated down the right hand margin. Since S equals 9, the addressable RAM space is 0-8 inclusive. For illustration purposes the clock has selected the start arbitrarily at zero and may increase without bound. For each clock cycle a read address has been illustrated by "R" and a write address illustrated with the "W". For those cases where the read and write addresses are identical for a given clock cycle, a "WR" is listed in the corresponding column. This notation indicates that the RAM is first written to. As previously mentioned, the counters are reset to zero before the process begins. Accordingly, the output of the RAM 108 for bits zero through eight of the RAM 108 are not used so the signalling word is transmitted instead. The compressed digital waveform is read out beginning with clock cycle 9. At that time the RAM write address counter 204 has incremented to 8 while the read address counter 206 has been reset back to zero. Therefore, the bit at address zero is read out from the RAM 108 on clock cycle 9 as is indicated in the "output" column. In a similar manner, bit 1 is read out on clock cycle 10, bit 2 on clock cycle 11, and so on. Viewing down the "output" column then it can be seen that bits 5, 11, 17, 23, 29, 35, 41, 47 and 53 have all been deleted from the output stream. The absence of these 9 bits made space for the 9 signalling bits that were transmitted on clock cycles 0-8. Accordingly, the digital waveform has been compressed to allow the insertion of a signalling word.

Figure 4:
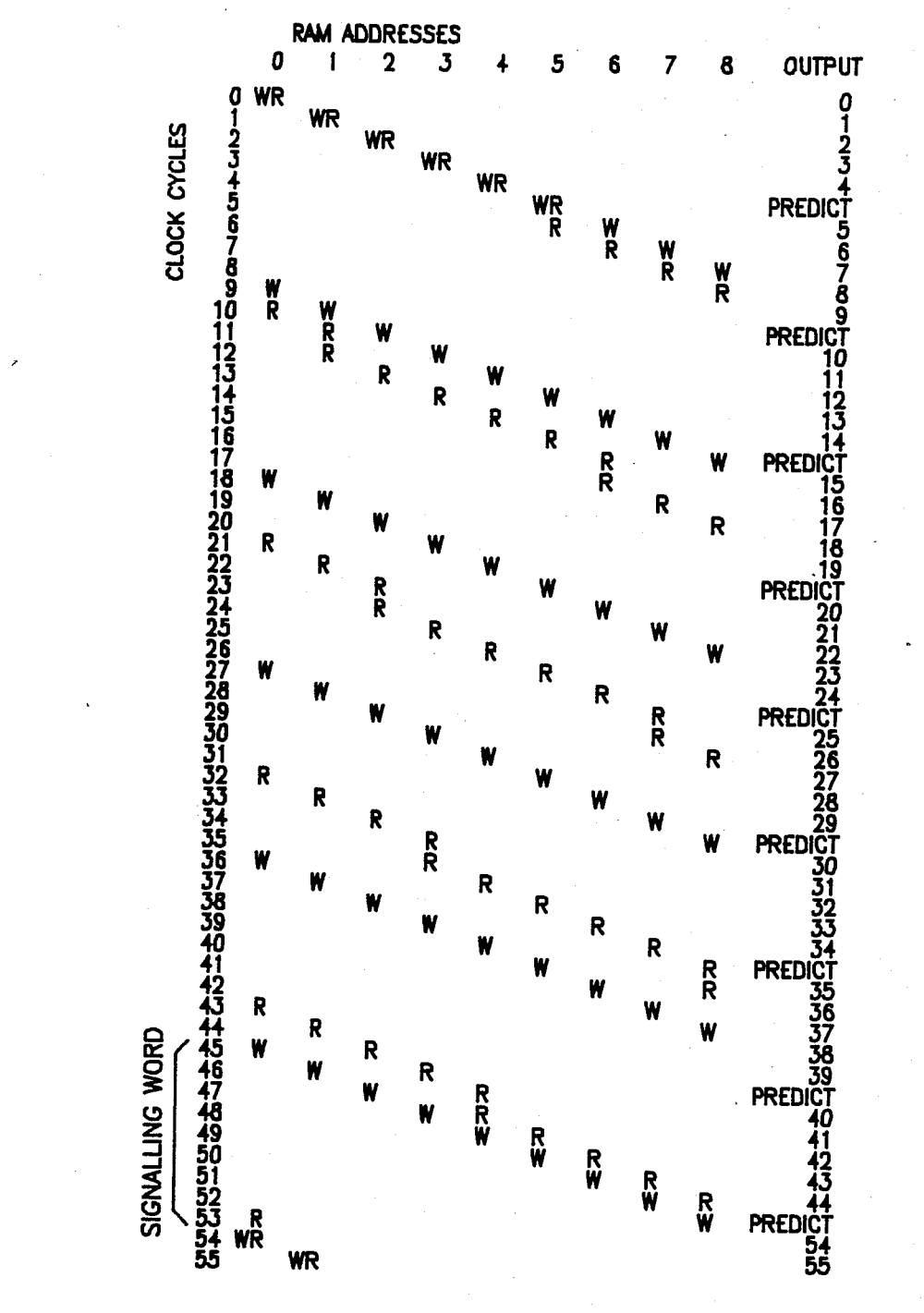

Referring now to FIG. 4, an illustration of the expander 200 of FIG. 2 for the same simple case of S equals 9 and N equals 6 is shown. As in FIG. 3, the RAM 208 addresses are listed from left to right across the top and the clock cycles 212 are listed sequentially from zero through 55. The 9 signalling bits are presumed to have been removed by any suitable means and that the incoming digital waveform is now synchronized to the clock 212. At a clock cycle zero, the 0th received bit is written into the RAM 208 on the rising clock edge and is read out on the next falling clock edge. This continues for bits 1-4 until the 5th received bit (bit 5, which was the first deleted bit in FIG. 3) is encountered. At clock cycle 5, a bit is inserted into the output stream by the predictor circuit 214 (see FIG. 2). At clock cycle 6, the 5th received bit (bit 5) is read out as an output. As can be seen, received bits 6-9 are read out in a similar manner on clock cycles 7-10 respectively. Thereafter, another predictor bit is inserted at clock cycle 11. This expansion process repeats until clock cycle 54. Following clock cycle 54, received bits 45-53 inclusive are discarded and the received bit 54 is read out. Bits 45-53 are discarded because they represent the next received signalling word and not compressed digital information.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. A method of expanding a compressed digital information signal having at least every Nth information bit removed and any remaining information bits contiguously arranged to form said compressed digital signal, said method comprising the steps of:
    (a) receiving the compressed information signal to provide a received signal;
    (b) predicting at least every Nth information bit from said received signal to provide predicted information bits, and expanding said received signal such that said predicted information bits may be interleaved therewith to provide a recovered signal.

2. The method of claim 1, wherein the step of predicting comprises the steps of:
    (a) storing said received signal in a storage means to provide a stored signal;
    (b) retrieving said stored signal from said storage means;
    (c) selecting, at every Nth bit of said stored signal at least one predicted bit derived from said stored signal.

3. The method of claim 1, which includes the step of synchronizing to said received signal.

4. The method of claim 1, which includes the step of:
    (a1) decrypting said received signal.

5. The method of claim 1, which includes the step of decrypting said recovered signal after step (b).

6. The method of claim 1, which includes the step of:
    (a1) decoding and correcting at least a portion of said received signal.

7. The method of claim 1, which includes the step of decoding and correcting at least a portion of said recovered signal after step (b).

8. An expander for expanding a compressed digital information signal having at least every Nth information bit removed and any remaining information bits contiguously arranged to form said compressed digital information signal, said expander comprising:
(a) means for receiving the compressed information signal to provide a received signal;
(b) means for predicting at least every Nth information bit from said received signal to provide predicted information bits;
(c) means for expanding said received signal to provide an expanded received signal, including means for interleaving said expanded received signal with said predicted information bits to provide a recovered signal.

9. The expander of claim 8, which includes means for decrypting a digital signal to provide an un-encrypted signal.

10. The expander of claim 8, which includes means for decoding a digital signal to facilitate error detection and correction.

11. A expander for expanding a compressed information signal having every Nth bit removed to provide a recovered signal, comprising:
means for providing a clock signal;
first means for counting said clock signal to provide an interleave signal;
second means for counting said clock signal to provide a write address signal;
third means for counting said clock signal to provide a read address signal;
means for interrupting said third counting means in response to said interleave signal;
means for temporarily storing the information signal in response to said write and read address signals; and
means for predicting every Nth bit of said temporarily stored signal in response to said interleave signal, including means for interleaving said predicted bits with said temporarily stored signal to provide the recovered signal.

12. The expander of claim 11, wherein said first, second and third counting means comprise binary counters.

13. The expander of claim 11, wherein said storage means comprises a random access memory.

14. The expander of claim 11, wherein said predictor means comprises a shift register of predetermined length.

15. The expander of claim 11 wherein said predictor means comprises an N×1 ROM addressed by the shift register.

16. The expander of claim 11, wherein said interleaving means comprises a switch means controlled by said interleave signal.

17. A method of recovering a bit stream from a version of said bit stream, said version comprising said bit stream having every Nth bit removed and any remaining bits arranged to form a first continuous bit stream, said method comprising the steps of:
(a) predicting each removed bit to obtain a corresponding predicted bit; and,
(b) inserting each said predicted bit into said version of said bit stream to form a second continuous bit stream.

18. A compressor for compressing a digital information signal, comprising:
means for providing a clock signal;
first means for counting said clock signal to provide an interleave signal;
second means for counting said clock signal to provide a write address signal;
third means for counting said clock signal to provide a read address signal;
means for storing the information signal in response to said write and read address signals; and
means for interrupting said second counting means in response to said interleave signal,
whereby, a bit of the information signal is discarded each time said interleave signal is asserted;
means for compressing the remaining information bits to provide a compressed information signal;
means for inserting a predetermined number (S) of data bits into said compressed information signal.

19. The compressor of claim 18, wherein said first, second and third counting means comprise binary counters.

20. The compressor of claim 18, wherein said storage means comprises random access memory.

21. A method for companding a digital information signal having a plurality of information bits, comprising the steps of:
at a transmitter:
(a) discarding at least every Nth information bit of the digital information signal, and arranging any remaining information bits such that all of said remaining information bits are contiguous, thereby providing a compressed information signal;
(b) combining a predetermined number of data bits with said compressed information signal to provide a composite signal;
(c) transmitting said composite signal; and,
at a receiver:
(d) receiving said composite signal to provide a received signal;
(e) extracting said compressed information signal from said received signal;
(f) predicting at least every Nth information bit from said compressed information signal to provide predicted information bits, and expanding said compressed information signal such that said predicted information bits may be interleaved therewith to provide a recovered signal.

22. A compander for companding a digital information signal having a plurality of information bits, comprising:
means for discarding at least every Nth information bit of the digital information signal, including means for arranging any remaining information bits such that all of said remaining information bits are contiguous, thereby providing a compressed information signal;
means for combining a predetermined number of data bits with said compressed information signal to provide a composite signal;
means for transmitting said composite signal;
means for receiving said composite signal to provide a received signal;
means for extracting said compressed information signal from said received signal;
means for producing at least every Nth information bit from said compressed information signal to provide predicted information bits;
means for expanding said compressed information signal to provide an expanded signal, including means for interleaving said expanded signal with said predicted information bits to provide a recovered signal.

* * * * *

UNITED STATES PATENT AND TRADEMARK OFFICE
CERTIFICATE OF CORRECTION

PATENT NO. : 4,893,308
DATED : January 9, 1990
INVENTOR(S) : Alan L. Wilson et al.

It is certified that error appears in the above-identified patent and that said Letters Patent is hereby corrected as shown below:

Col. 8, line 60, "producing" should be --predicting--.

Signed and Sealed this

Eighth Day of January, 1991

Attest:

HARRY F. MANBECK, JR.

*Attesting Officer*   *Commissioner of Patents and Trademarks*